Oct. 13, 1925.
C. C. COLBERT ET AL
1,557,422
DRYING APPARATUS
Filed Oct. 3, 1923    7 Sheets-Sheet 1
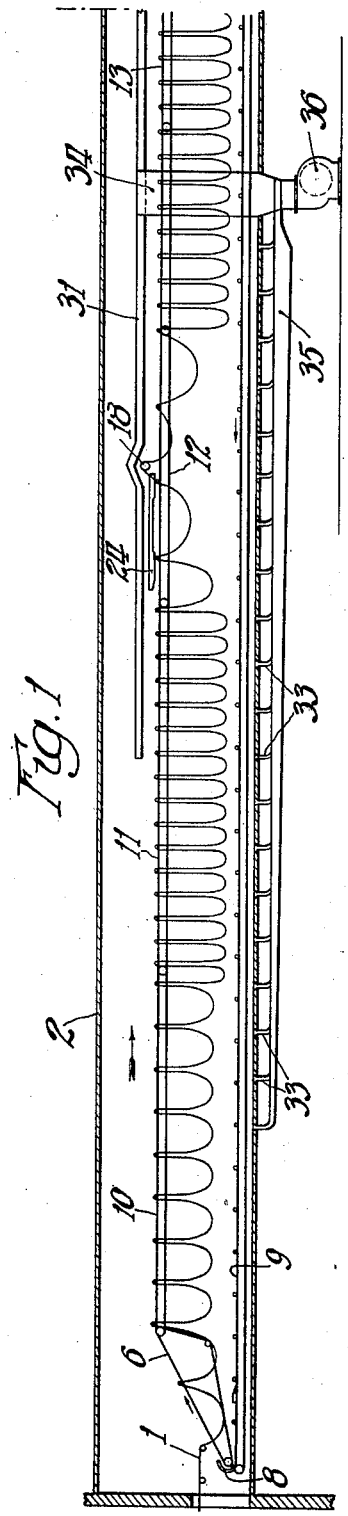
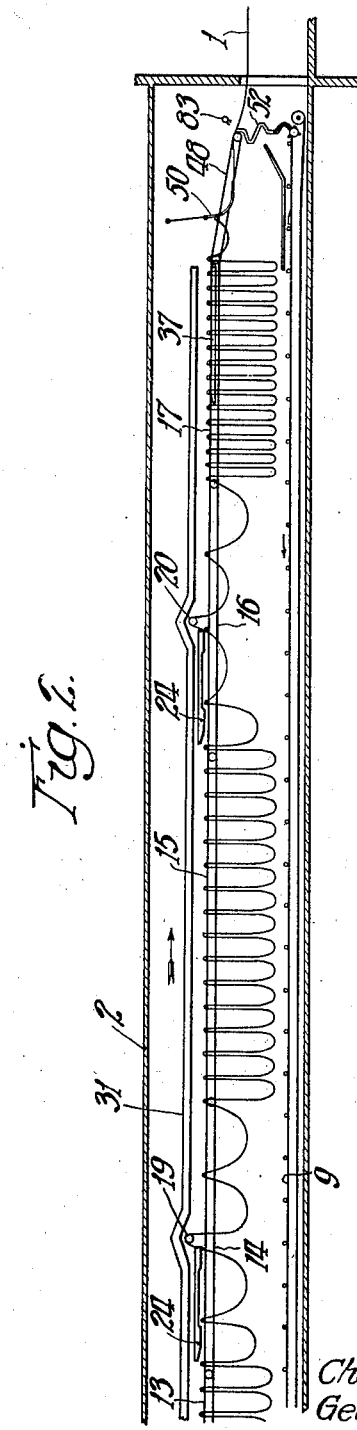
Inventors:
Charles C. Colbert
George E. Preston.

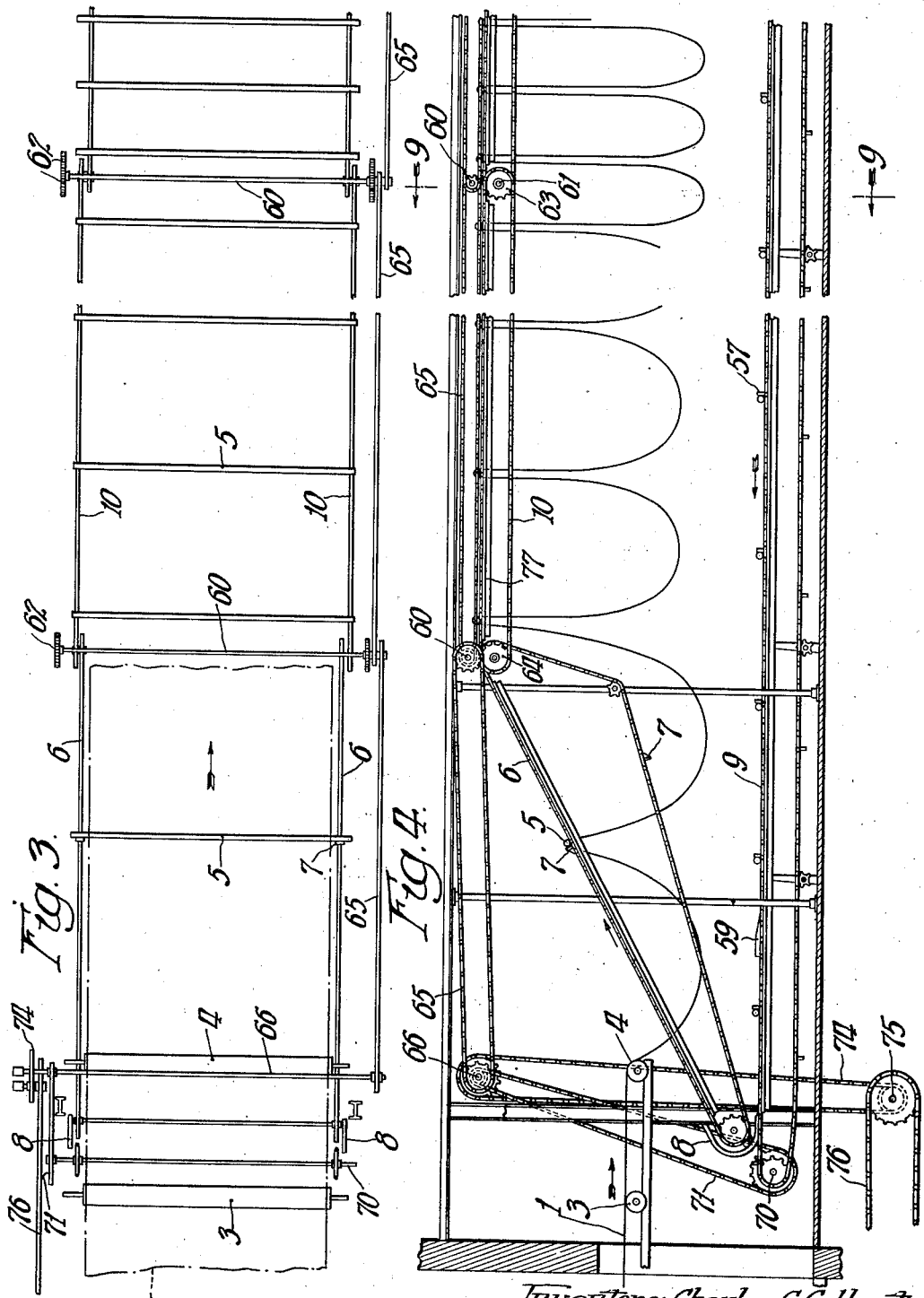

Oct. 13, 1925.
C. C. COLBERT ET AL
1,557,422
DRYING APPARATUS
Filed Oct. 3, 1923   7 Sheets-Sheet 3
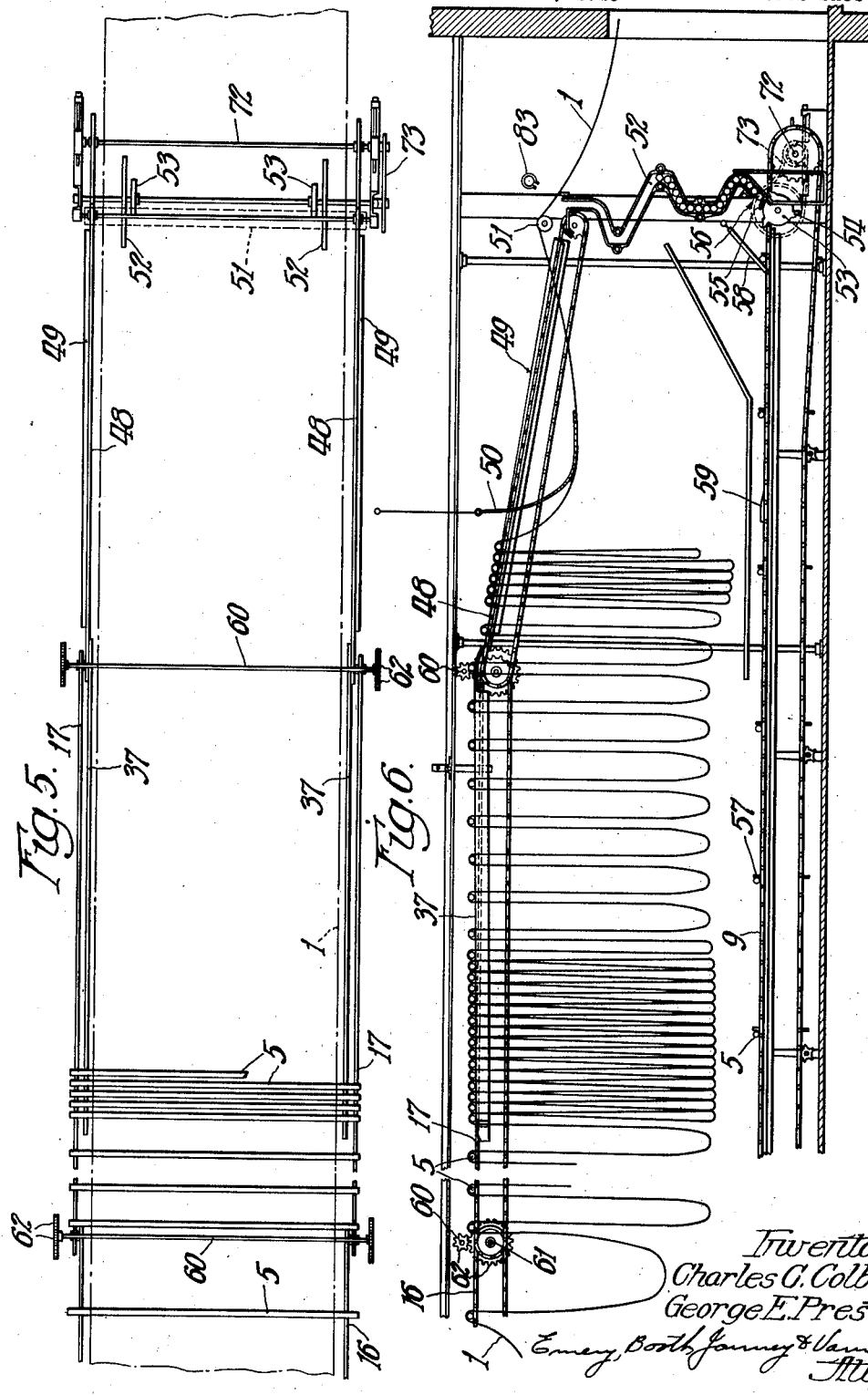
Inventors:
Charles C. Colbert
George E. Preston.
Emery, Booth, Janney & Varney
Attys.

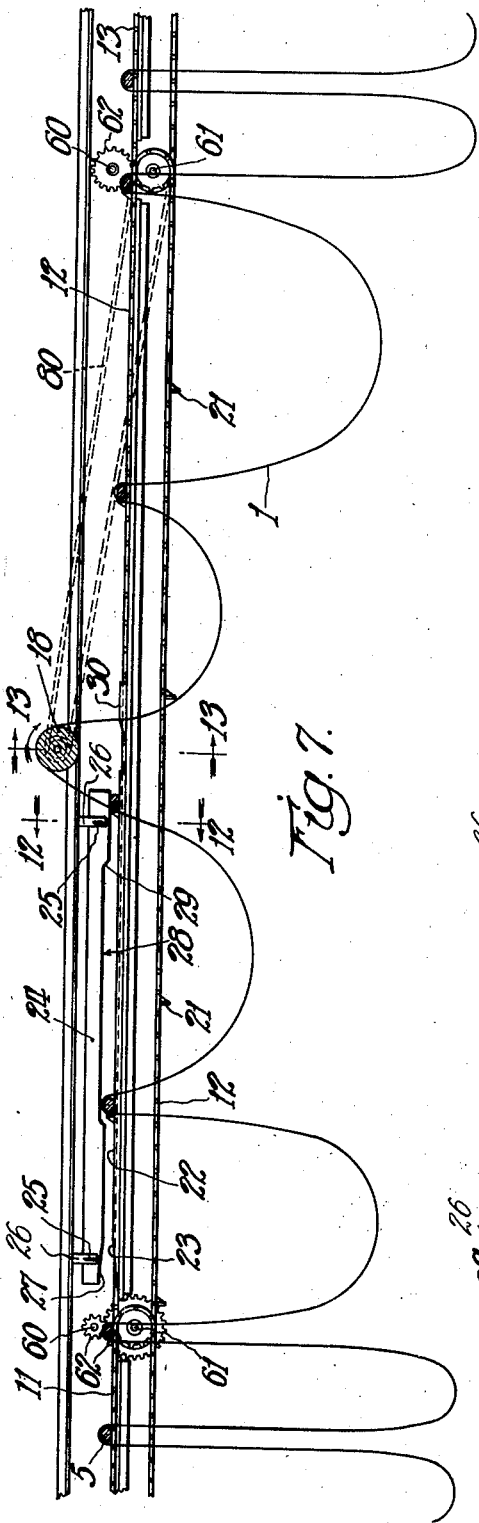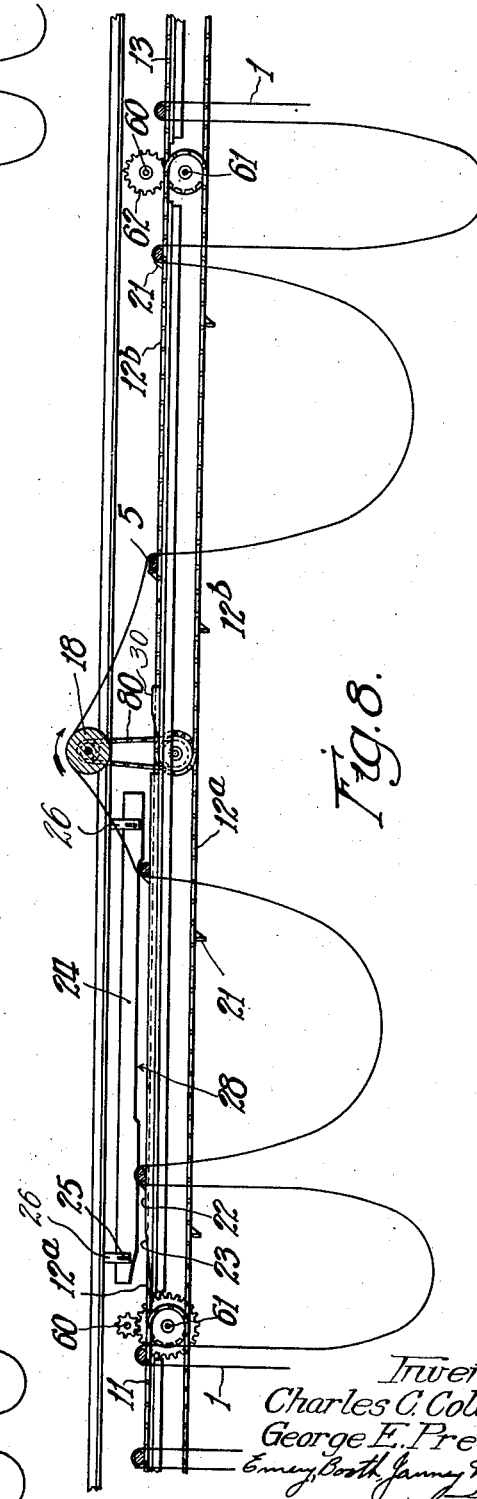

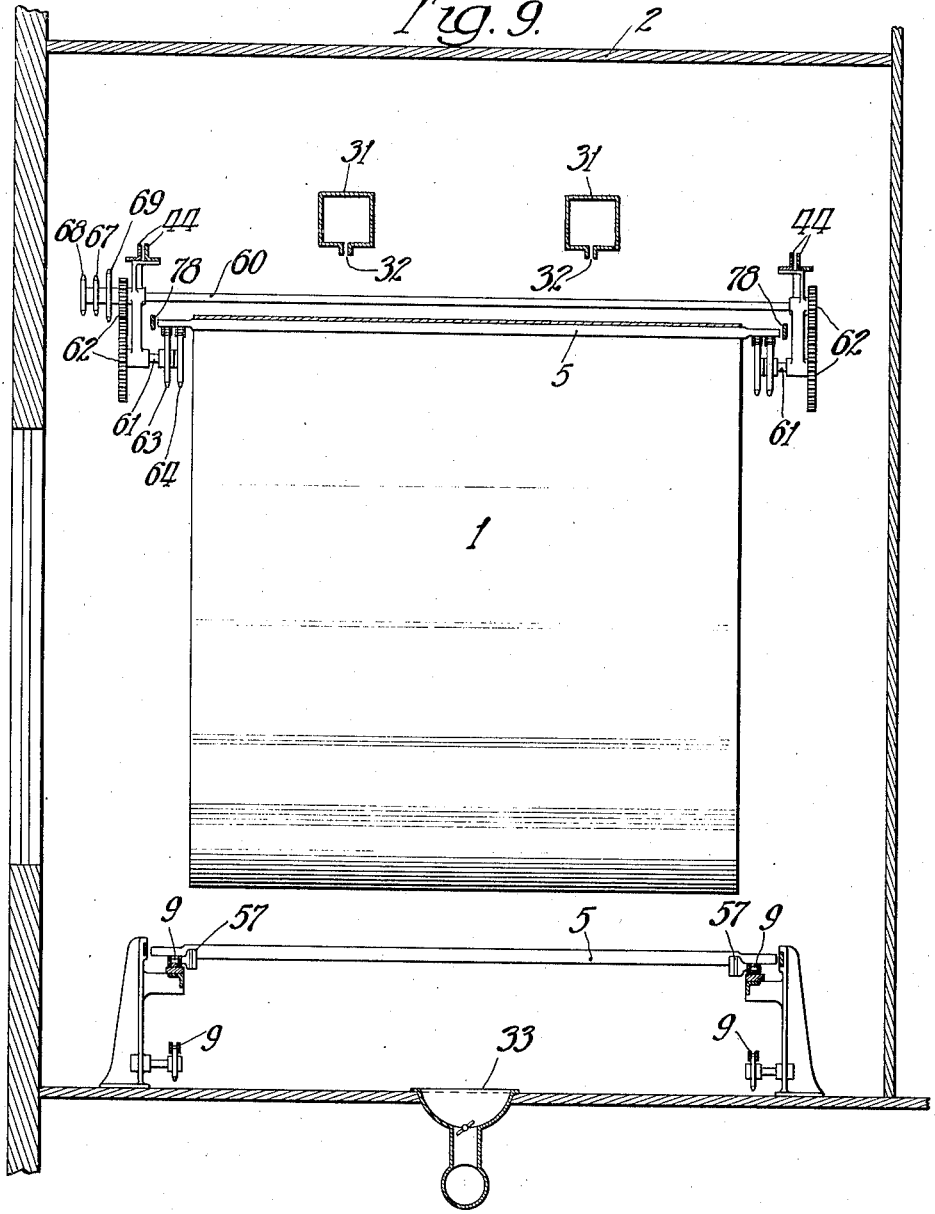

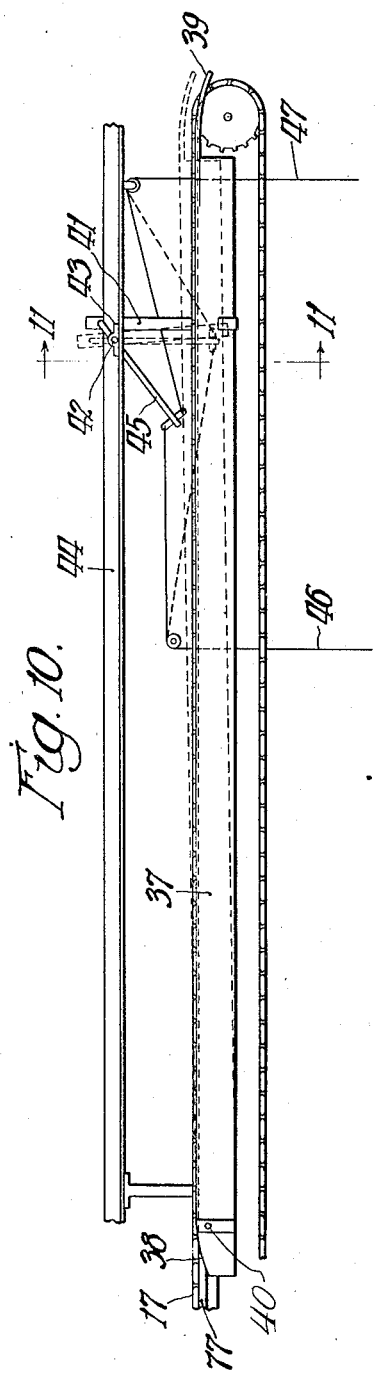
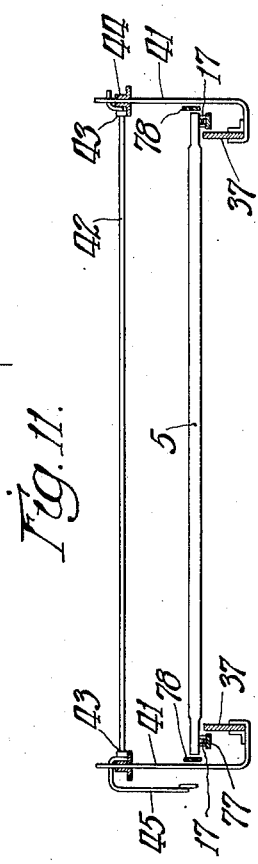
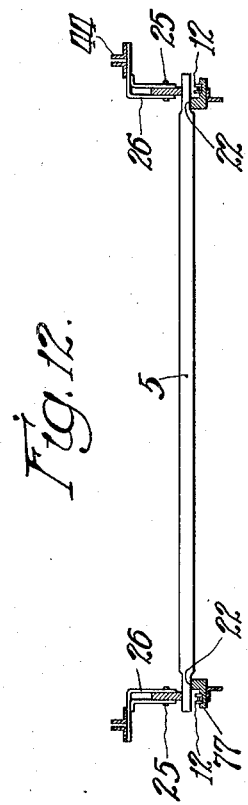

Oct. 13, 1925.

C. C. COLBERT ET AL 1,557,422

DRYING APPARATUS

Filed Oct. 3, 1923

Inventors:
Charles C. Colbert
George E. Preston.
Emery, Booth, Janney & Varney
Attys.

Patented Oct. 13, 1925.

1,557,422

UNITED STATES PATENT OFFICE.

CHARLES C. COLBERT AND GEORGE E. PRESTON, OF ELKHART, INDIANA, ASSIGNORS TO AMERICAN COATING MILLS, OF ELKHART, INDIANA, A CORPORATION OF INDIANA.

DRYING APPARATUS.

Application filed October 3, 1923. Serial No. 666,268.

*To all whom it may concern:*

Be it known that we, CHARLES C. COLBERT and GEORGE E. PRESTON, citizens of the United States, and residents of Elkhart, in the county of Elkhart and State of Indiana, have invented an Improvement in Drying Apparatus, of which the following is a specification.

Among other objects, the present invention is intended to provide apparatus for conducting a drying operation such as hereinafter indicated in an advantageous manner with regard to the material undergoing treatment, as well as with regard to such considerations as economy, rapidity of operation, and convenience of facilities.

The invention will be clearly understood by reference to one practicable form of apparatus embodying the same, shown in the annexed drawings.

In said drawings:

Figs. 1 and 2 collectively represent a longitudinal vertical section of a drying room incorporating the illustrative apparatus, Fig. 1 showing the first half and Fig. 2 showing the succeeding half thereof. These views are partly diagrammatic, omitting mechanical details sufficiently shown in the remaining figures.

Fig. 3 is a plan view of the receiving end of hang-up and conveying equipment by which the material is exposed to drying action in said room.

Fig. 4 is a side view of the portion of said hang-up and conveying equipment shown in Fig. 3.

Fig. 5 is a plan view of the delivery section of said hang-up and conveying equipment.

Fig. 6 is a side view of the portion of the apparatus shown in Fig. 5.

Fig. 7 is a side view of an intermediate section of the hang-up and conveying equipment.

Fig. 8 shows an alternative construction for such a section of the conveying system as is represented in Fig. 7.

Fig. 9 is a vertical cross section on the line 9—9 of Fig. 4.

Fig. 10 is a detail side view of a dead rack rail.

Fig. 11 is a cross section on the line 11—11 of Fig. 10.

Fig. 12 is a detailed section on the line 12—12 of Fig. 7.

Figure 13:
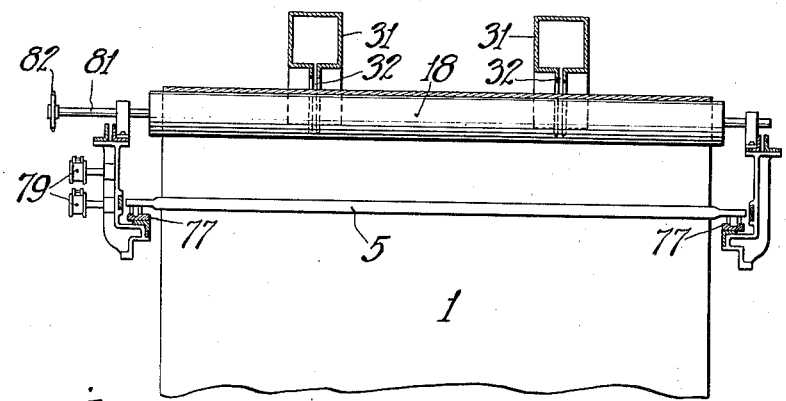
Fig. 13 is a section on the line 13—13 of Fig. 7.

A web of material undergoing drying action is designated in the drawings by the numeral 1.

The apparatus selected for illustration is described in connection with the drying of coated paper board. A large quantity of continuous board, accumulated in undulating formation or in a succession of open folds, is exposed to drying treatment in said apparatus, which is shown incorporated in a drying room 2. The drying process may progress as the board moves along or through the room, while the freshly coated board is drawn into the receiving end of the room and the dried board is withdrawn from the other end for finishing the coated surface of the board and subdividing or reeling the finished product.

Contact with the coated surface of the board should be avoided until after it is substantially dry. In this instance, board having a liquid coating applied to a selected surface runs with its coated side uppermost into and through the drying room, in which it is supported from its under or uncoated side.

In Figs. 1 and 4, the board is shown running into the receiving end of the drying room over rollers 3 and 4, and being hung up in festoons on transverse supports provided by so-called sticks 5. These sticks preferably consist of round wooden poles having their ends flattened to rest on supporting or conveying means without tendency to turn or roll. They should be of sufficient diameter to provide ample supports from which the board may hang without sharp bending. If desired the sticks may be utilized in pairs or pluralities to provide said supports in the case of hanging up very stiff board.

The sticks 5 are brought under the infeeding board at appropriate intervals of time to allow desired lengths of the board to hang between the successively presented sticks. This may be accomplished by a pair of endless elevating chains 6 arranged at opposite sides of the board and having suitably spaced lugs 7 for engaging and forwarding the sticks. Said elevating chains pick up the sticks from curved guides 8 arranged coaxially with the lower sprocket wheels of the chains, and into which guides the sticks are successively delivered by a conveyor 9 as hereinafter explained.

The elevating chains deliver the sticks with the hung-up board to conveying means represented by parallel endless chains 10, spaced apart appropriately to support the ends of the sticks while allowing the festoons to hang between the chains, and by successive sets or pairs of endless chains 11, 12, 13, 14, 15, 16, 17, which successively carry the sticks with the hanging board, the sticks being transferred from one set of chains to another. These successively arranged sets of carrier chains run at different speeds as presently to be described for changing the spacing of the sticks, with accompanying contraction or expansion of the festoons of board carried thereby.

By running the first pair of carrier chains 10 at an appropriate speed in relation to the elevating chains 6, the sticks carrying the hung-up board are placed upon said chains 10 at desired intervals apart, preferably at fairly wide intervals so as to carry the festoons of board in comparatively distended condition for an initial drying treatment.

In this instance, the chains 11 to which the sticks are delivered by the chains 10 run at a somewhat slower speed than the preceding chains, thereby receiving the sticks at closer intervals and contracting the festoons, so that a greater quantity of board, accumulated in closer formation, is submitted to drying action in the region of the room traversed by said carrier chains 11.

From the relatively slow running chains 11, the sticks carrying the festoons of board are transferred to the chains 12 which run at a relatively fast speed so as to take the sticks at wide intervals apart and thereby spread out or expand the festoons.

The succeeding chains 13 run at a relatively slow speed for again spacing the sticks at closer intervals and narrowing the festoons. So on through the conveying system, the festoons are carried in alternately expanded and contracted condition, and at varying rates of speed; the sections 12, 14 and 16 of the conveying system running at relatively fast speed and the alternating sections 11, 13, 15 and 17 running at relatively slow speed.

As the drying process progresses, it is desirable to reform the festoons in order to change the points of suspension of the board and expose the board differently to the drying medium in the room. For this purpose the board may be shifted longitudinally of its supports by training the board over one or more overhead rollers such as indicated at 18, 19 and 20. These rollers are preferably associated with the fast running sections 12, 14 and 16 of the conveyor system.

One of said fast running conveyor sections with an overhead shifting roller is shown in Fig. 7, from which it will be seen that the board trained over the roller is withdrawn from the successively advancing sticks and is re-engaged by said sticks beyond the roller at different points from those previously engaged by the respective sticks. Thus the points of suspension of the board are automatically changed. The said overhead roller is power driven at appropriate speed for withdrawing the board from the sticks and effecting a desired lineal advancement of the board relative to the sticks.

To maintain desired spacing and correct transverse alignment of the sticks on the fast running carrier chains 12, 14 and 16, as well as to prevent dislocation of the sticks during shifting of the board relative to its supports, said chains are provided as shown in Fig. 7 with stick-engaging lugs 21, and certain retarding devices are arranged to resist movement of the sticks and thus maintain them in engagement with said lugs. The specific means shown is as follows: Rails 22 having inclined or beveled front ends 23 are arranged beside said carrier chains and rise gradually above the level thereof but not above the projections of the chain lugs 21. Above these rails are hanging bars 24 connected by bolt and slot connections 25 to hangers 26, permitting said bars to be raised. A stick 5 transferred from the slow running chains 11 to the fast running chains 12 rides up the beveled ends 23 of the rails 22 and against the under beveled ends 27 of the upper bars 24. This causes the stick to pause until its ends are engaged by an opposite pair of the chain lugs 21 on said fast running chains 12. These chain lugs then push the stick between the rails 22 and upper bars 24, the latter being elevated by the stick. Said upper bars may have their under surfaces recessed at 28 to relieve the sticks of the weight of said bars. Before passing out from between the rails 22 and upper bars, the stick again engages the upper bars at 29 and is forced out between the rails and the under surfaces of the upper bars bearing on the stick. Thus the stick resists dislocation by the pull of the hanging board as it is drawn past the stick over the overhead roller, and correct transverse alignment of the sticks on the parallel chains is maintained. After passing under the overhead roller and to position for reengagement of the board, the stick may be caused to ride over inclined obstructors 30, thus insuring its alignment by maintaining it against the chain lugs 21. It will be understood that each board shifting section of the conveying system is equipped with means of the character just described.

Fig. 8 shows an alternative construction for a section of the conveying system in which shifting of the board takes place. In this alternative construction, successive sets of carrier chains $12^a$ and $12^b$ replace the carrier chains 12 of Fig. 7, and the inclined obstructors 30 are arranged beyond the juncture of said chains. Both sets of chains $12^a$ and $12^b$ are equipped with chain lugs 21, but the arrangement is such that the chains $12^b$, whether travelling at the same speed as the chains $12^a$ or otherwise, engage the stick after its delivery from the chains $12^a$ and while it is pausing on the obstructors 30. Otherwise the construction is the same as that of Fig. 7. By apropriate speed adjustment of the chains $12^a$ and $12^b$ in relation to the speed of the overhead roller, or by appropriate arrangement of the respective chain lugs, or both, the period of pause of the stick on the obstructors 30 may be predetermined to effect resumption of travel of the stick in reengagement with the board beyond the roller at the desired point on the board. This construction also lends itself to various adaptations in the relative spacing and speeds of conveyance of the festoons in advance of and beyond the shifting point.

From the foregoing description, it will be seen that the coated board hanging in festoons or folds is conveyed through the drying room by a succession of conveying means running at alternate rates of speeds, so as alternately to contract and spread out the festoons to drying action; while the conveyance of the board in this manner is accompanied by one or more shiftings of the board to change its points of suspension, or in other words to cause the board to hang on the sticks from portions which were previously suspended between the sticks. These actions promote efficient and uniform drying of the board; while the successive shifting of the points of support prevents formation of undesirable bends or ruffles in the board and checking of its coated surface.

A heating system for the drying room is represented by a pair of overhead longitudinal hot air ducts 31 having slots 32 in their under sides for blowing heated air upon or toward the upper or coated side of the board, and a number of nozzles 33 in the floor of the room for blowing heated air against the under or uncoated side of the board. In Fig. 1, manifolds for supplying the hot air to the overhead ducts and bottom nozzles are respectively indicated at 34 and 35, these manifolds being connected with a suitable blowing apparatus 36 which may be supplied with hot air from any suitable source or with air heated in any appropriate way.

In drying coated board, it is desirable to subject the board to a gentle and gradual preliminary drying, without exposure of its coated surface to direct action of heat currents, and then to submit the board to a more pronounced drying action in the presence of heat currents directed toward its coated side. By this treatment there is obtained an advantageous preliminary evaporation of moisture and seasoning of the body of the board, and its coating acquires a setting and consistency adapting it to withstand the ensuing more severe drying action.

It will be observed by reference to Fig. 1, that the heating system of the illustrative room is so arranged that the hanging festoons of board are conveyed a considerable distance beyond the receiving end of the room before coming within the range of the bottom hot air nozzles 33, and are conveyed a further considerable distance before coming within the range of the overhead hot air ducts 31; and that the festoons are within the range of both the overhead and underneath heat blasts for a limited distance, after which the drying of the board is continued by the overhead blasts. The specific arrangement shown is such that the festoons first encounter the action of the underneath blasts while conveyed in comparatively distended condition by the first set of longitudinal carrier chains 10, and are subsequently acted upon by said blasts while conveyed in closer folded condition by the carrier chains 11.

This arrangement provides in the drying room a region of preliminary drying, the action of which progresses in two general stages and in several steps. First, the freshly coated board is conveyed with its festoons fairly distended or spread through a substantial distance without submission to drying influence other than the relatively quiescent and temperate atmosphere of the room, accomplishing a gentle initial drying and setting of the coated surface of the board. Then the festoons come within the range of the underneath heat currents, blowing upwardly against the under or uncoated side of the board and into the spaces between the festoons, warming the body of the board and further advancing the drying. This stage of treatment, commencing while the festoons are moving in relatively distended condition, continues in the illustrative room while the festoons are more slowly moved in contracted condition by the carrier chains 11, during which step there is a relatively greater quantity of the board maintained for a relatively longer period within the range of the underneath blasts. Thus an effectual progressive drying ensues in advance of exposure of the coated surface of the board to the direct action of impinging heat currents.

According to the specific arrangement shown, the festoons are brought within the range of the overhead hot air ducts 31 while conveyed in comparatively contracted condition by the slow running chains 11. As the hanging board is further conveyed along the drying room, by a number of successive sets of carrier chains, it is exposed under varying conditions and differently presented to the currents of heated air discharged by said overhead ducts; and also continues for a certain distance to be exposed to the heated air currents ascending from the floor nozzles 33.

In the regions of the drying room traversed by the slow running sections 11, 13, 15, 17 of the conveying system, extensive accumulations of the board in narrow festoons are maintained, so that the volume of heating medium acting during any given interval in these regions is expended upon a relatively large quantity of material, while given portions of the material are exposed in these regions for relatively prolonged periods. Said regions may be appropriately referred to as zones of protracted drying. In the alternating regions of the fast running conveyor sections 12, 14, 16, the board in expanded or distended condition is exposed for relatively briefer intervals, during which the volume of heating medium acts upon relatively small quantities of the board. Thus the drying action per unit of time per unit area of material is substantially greater than that in the zones of protracted drying. Furthermore the drying effect in the regions of the fast running conveyor sections is promoted by the spreading out of the board, and still further accentuated if the board is run over the overhead shifting rollers in proximity to the overhead air ducts. These regions may accordingly be referred to as zones of accelerated drying.

By changing the points of suspension of the board, involving reformation of the festoons, the board is differently exposed in successive drying stages, bringing portions which formed lower or intermediate lengths of the festoons in one stage into position for presentation as the upper portions of the festoons in a subsequent stage. Thus different portions of the board are variously exposed to the action of the heat currents in successive drying stages, and the drying action of certain stages complements the drying action of other stages, in addition to continually advancing the degree of dryness of the board. By appropriately reforming the festoons or effecting appropriate longitudinal shifting of the board a sufficient number of times, the board may be dried substantially uniformly throughout its length.

As the board moves rapidly over an overhead shifting roller, its coated surface is uniformly subjected to the action of the hot air blasts in close proximity to the ducts 31, as will be apparent from Fig. 13. This again contributes to efficient and uniform drying. It may however be unnecessary or undesirable in some cases, depending upon the character of the board under treatment and the nature and thickness of the applied coating, to run the board over all the overhead rollers, or to expose its coated surface to close action of the hot air blasts in every zone of accelerated drying, and especially the first such zone. For instance, in some cases the liquid coating may be in too fresh or wet a condition for close exposure to hot air blasts while in the region of the drying room traversed by the chains 12; and in the case of board coated with a thin or quickly drying composition close exposure to the hot air currents in all of the zones of accelerated drying might result in too severe or sudden drying, rendering it expedient to carry the board under one or more of the overhead rollers, or to effect the shifting without such close exposure. For instance, the bottom discharge slots of the overhead ducts may be closed at these portions overlying a roller, so as to permit running the board over such roller for shifting purposes without accompanying severe drying treatment.

With the heating arrangement shown, the board undergoes a period of drying in a medium discharging against its uncoated side, overlapping with a period of drying by a medium discharging toward the coated side of the board. The overlapping interval, in which the board is simultaneously exposed to the action of both the descending and ascending currents of heated air, represents a period of relatively pronounced drying which in this instance occurs in successive steps or stages in the region of the drying room traversed in part by the slow running chains 11, the fast running chains 12, and in part the slow running chains 13. By thus submitting the board under varying conditions to the conjoint action of the ascending and descending currents of heated air, after the period of progressive preliminary drying heretofore described, the board is brought to a condition in which it is adequately responsive to the succeeding stages of drying action, which in this instance are continued by the descending currents of heated air upon the coated side of the board until and, if desired, during the accumulation of the board in the delivery end of the drying room.

The operations described provide a method by which coated paper board is advantageously dried by progressive steps or stages of drying action of different kinds and effects, including recurrent heat treatments under varying conditions in the presentation of the board thereto, for obtaining efficient and substantially uniform drying in the time interval between the coating and finishing of the board.

From an accumulation of the dried board hanging in the delivery end of the apparatus, either on the chains 17 or a succeeding set of chains or supporting means associated therewith, the board may be continuously withdrawn for calendering or finishing its coated surface and subdividing the finished product into cut sheets. It may be desirable to vary accumulation to accommodate conditions arising in the operation of the plant in which the drying room is included. For example, where coated board is being continuously manufactured and runs continuously through the coating machine except for such occasional interruptions as may be required for changing coating brushes or colors or for other purposes, it is desirable in event of temporary interruption of a succeeding unit of the plant to permit continuing accumulation of the board in the delivery end of the drying room; and, on the other hand, in event of interruption of the coating operation, with an accompanying stoppage of the drying room conveying system, it is desirable to have a reserve supply of the hanging folds of dry board from which the board may be continuously withdrawn for the subsequent finishing and subdividing operations.

For maintaining such a reserve supply, or permitting continued accumulation in event of any interruption or slowing of operation in a succeeding machine or unit of the plant, there is provided preferably in association with the last section of the conveying system, in this instance the carrier chains 17, a so-called dead rack presently to be described. This dead rack, shown more clearly in Figs. 5, 6, 10 and 11, comprises longitudinal rails or bars 37, one beside each of the parallel chains. Said dead rack bars are supported so as to permit them to be depressed below the levels of the carrying runs of the chains, in the position shown in Figs. 2 and 10, which is their normal position, or to be elevated above the chains in the position indicated by dotted lines in Fig. 10. The rear or receiving ends of said bars are beveled or inclined as indicated at 38 so that, when the bars are in the elevated position shown in Fig. 6, the sticks 5 carrying the festoons of board may ride onto the dead rack bars, after which the sticks will be pushed along said bars one by the other. Thus a large number of festoons may be collected in close assembly. The delivery ends of the dead rack bars are shown provided with curved extensions 39 which in elevated position of the bars will overlie the sprocket wheels at the delivery ends of the carrier chains and permit the sticks to be discharged from the delivery end of the dead rack.

In the specific construction shown in the drawings, the dead rack bars 37 are pivoted at their receiving ends to suitable supports, as indicated at 40 (Fig. 10), while their delivery end portions are carried by hangers 41, suspended from cranked portions of a crank shaft 42 journaled in bearings 43 in the upper framework 44 of the hang-up and conveying system. One of the cranked portions of the crank shaft 42 is provided with an operating lever 45 which may be operated in one direction or the other by pull cords 46 and 47. By means of the lever 45, the cranked portions of the crank shaft may be moved to a position of dead centers with respect to the bearings of the crank shaft, thus supporting the dead bars 37 in elevated position, and the parts may be maintained in this position by maintaining the pull cords 46 and 47 taut and fastening them in any convenient position.

At the delivery end of the conveying system, means is provided to facilitate withdrawal of the dried board from the accumulated supply hung up therein, without liability of injuring or tearing the board. For this purpose the last pair of carrier chains 17 delivers the sticks 5 for carrying the suspended folds of board upon declined conveyor chains 48 from which the sticks are delivered to declined rails 49 arranged beside said chains 48 and gradually rising to an elevation above the chains to permit the sticks to ride from said chains onto said rails. The hanging board is withdrawn from the sticks resting on said rails 49, while the sticks slide down the rails and are discharged.

If the dead rack bars 37 are depressed, the sticks 5 will ride from the chains 17 onto the declined chains 48 and thence onto the rails 49, and the sticks will be caused to slide down the rails under the drag of the hanging board as it is withdrawn from the drying room. If the withdrawal of the board should be interrupted by temporary interruption in the operation of a succeeding unit of the plant, the sticks with the hanging folds of board may crowd together and accumulate on the declined rails 49 as shown in Fig. 6. If the interruption of withdrawal is for a longer period than that which can be accommodated by the accumulating capacity of said rails, while the coated board is being continuously supplied to and hung up in the conveying system, the dead rack bars 37 may be elevated, as before explained, allowing the successively advancing sticks carrying the festoons to collect in crowded assembly on said bars. Upon resumption of operation in the succeeding unit of the plant, with accompanying resumption of the withdrawal of the board from the drying room, the dead rack bars may be depressed to allow the sticks to rest again upon the conveying chains 17, which will deliver the crowded sticks onto the chains 48 and thence onto the declined rails 49; and the operation of said succeeding unit may be temporarily speeded up to effect a more rapid withdrawal of the board until the excess accumulation is drawn off and normal conditions are restored.

It will be seen that the decline rails 49 afford provision in addition to the dead rack for variation of accumulating capacity in the delivery end of the conveying system. Besides this function, said rails 49 also retard the travel of the sticks and offer a desirable frictional resistance to the movement of the sticks as the sagging board is withdrawn over the sticks. Furthermore, under various conditions, these rails permit the sticks to accumulate one behind another during and until the withdrawal of the board from folds suspended between successive sticks, thus avoiding continued travel of the sticks during the withdrawal.

The pull of the board as it is withdrawn from the hang-up apparatus drags the sticks down the declined rails 49 and causes them to slide down the rails and to be discharged. There may be frequently a number of sticks in close relation on the rails. To prevent the pull of the board from dragging the sticks and crowded festoons of board too rapidly down the rails, and to prevent jerking of the board from the successive folds, there is provided a suspended or swinging wiper 50, such for instance as a sheet of carpet or other suitable flexible material, which rests upon and drags against the board and exerts a retarding action on the sticks. Thus the board is withdrawn against the resistance of the swinging wiper 50 and of the sticks in frictional contact with the declined rails 49, contributing to smooth and even withdrawal.

The board may be withdrawn from the delivery end of the apparatus over a guide roller 51, while the sticks 5 pass from the declined rails 49 onto the delivery ends of the chains 48 and are deposited in a magazine comprising parallel guides 52, which are advantageously zig-zag shaped to break the fall of the sticks. The sticks pile one upon another in the magazine, in which a reserve supply of the sticks is maintained, and the sticks are successively ejected from the lower end thereof by rotating wheels 53 having ejecting lugs 54. To permit ejection, the lower ends of the magazine guides are shown constructed with feet 55 to support the sticks and with ejecting openings 56.

The ejected sticks are carried by the return conveyor 9 back to the receiving end of the drying room. Said return conveyor is shown as a pair of parallel chains provided at suitable intervals with lugs 57 for engaging and forwarding the sticks. As the sticks are successively ejected from the magazine, swinging bumpers 58 knock against the sticks to steady them and prevent them from being thrown too far. As a means for strengthening or aligning the sticks transversely of the return conveyor, inclined obstructors 59 are placed in the path of the sticks, over which the sticks must ride, thus ensuring their lodgment against the lugs 57 on the return conveyor chains and their delivery to the receiving end of the hang-up and conveying equipment in proper transverse alignment.

At said receiving end, the return conveyor 9 delivers the sticks into the curved guideways 8 associated with the lower sprocket wheels of the elevating chains 6 which pick up the successively presented sticks and carry them into position for hanging up the infeeding board as before explained. Thus the sticks are circulated back and forth through the apparatus, and a reserve supply of the sticks is maintained in the magazine 52, to permit variation in the number of sticks employed at a given time according to conditions existing as to the accumulation of the board in the delivery end of the apparatus.

Figure 14:
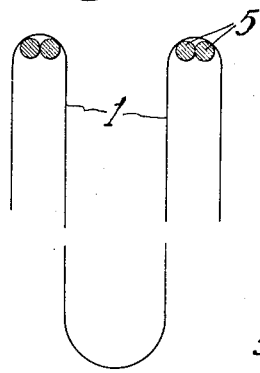
Fig. 14 is a detailed view representing successive folds of the material supported by pairs of sticks instead of by single sticks as represented in the preceding figure.
Figure 15:
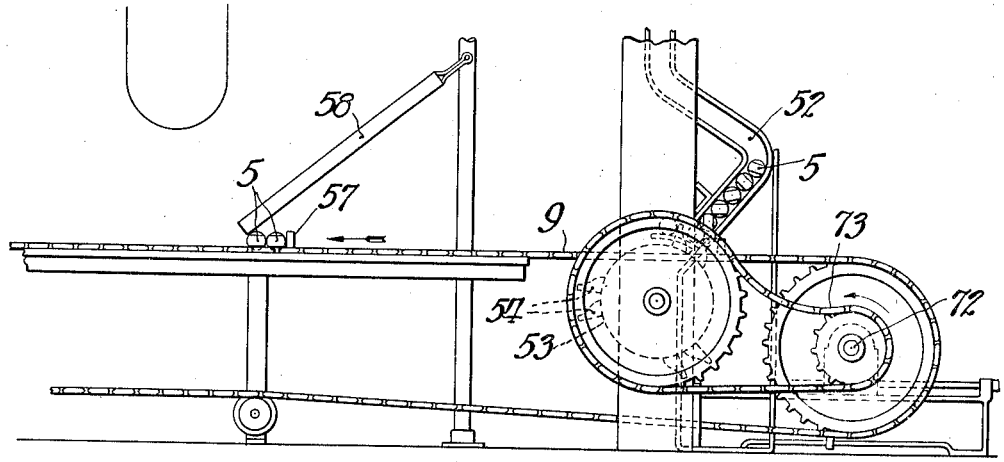
Fig. 15 is a side view showing a portion of the return conveyor for the sticks adapted for circulating two sticks at a time instead of one.

In the organization of the apparatus shown in Figs. 1 to 13, the sticks 5 are employed singly as supports for the hanging board. Hence the sticks are ejected one at a time from the magazine guides 52, at such intervals of time as to be successively engaged and forwarded by the successive lugs 57 of the return conveyor 9, and are delivered one at a time into the curved guides 8 at proper periods to be picked up by the successively advancing lugs 7 of the elevating chains. Should it be desired to use the sticks in pairs or groups as individual supports for the festoons, as indicated in Fig. 14, the ejecting wheels 53 may be equipped with additional ejecting lugs or have their ejecting lugs arranged in pairs, as shown in Fig. 15, so as to cause ejection of the sticks in pairs or groups between the successive lugs of the return conveyor, which will deliver the ejected pairs or groups of sticks one after another into the curved guideways 8 in proper sequence to be picked up by the successive lugs of the elevating chains.

The means illustrated for driving the hang-up and conveying system in the drying room is as follows:

The elevating chains 6, and the succeeding pairs of carirer chains 10, 11, 12, 13, 14, 15, 16 and 17 are driven at their respective delivery ends by a number of overhead shafts 60. (Figs. 3 to 7.) The driving sprockets for these successive pairs of chains are mounted on stub shafts 61 driven by gearing 62 from said overhead shafts 60. Beside the driving sprockets for each pair of chains, and loosely mounted on the same stub shafts which carry the driving sprockets, are idle sprockets for the receiving ends of the succeeding pair of chains. For instance, as shown in Fig. 9, driving sprockets 63 for a preceding pair of conveyor chains, and driven sprockets 64 for a succeeding pair of conveyor chains, are shown coaxially mounted on the stub shafts 61; the said driving sprockets being fast on said stub shafts and the said driven sprockets being loose thereon. Thus each pair of carrier chains runs from idle sprockets to and around driving sprockets coaxial with the idle sprockets for the next pair of chains. This description applies to all of the overhead carrier chains except the declined delivery chains 48 which run from driving sprockets coaxial with the driving sprockets of the preceding carrier chains 17.

The several overhead shafts 60 may be driven by a system of chains 65 from a shaft 66 (Figs. 3 and 4). The transmission chains 65 may run from one shaft 60 to another around sprocket wheels of appropriate proportions to maintain the desired relative rates of speed of the successive pairs of carrier chains. For instance, in Fig. 9, the overhead shaft 60 is driven by a chain engaging the sprocket wheel 67 and communicates power to a succeeding shaft by a chain engaging the sprocket wheel 68. An additional sprocket wheel 69 is shown on the shaft 60 for use in changing ratios of speed of the succeessive sets of carrier chains.

As shown in Figs. 3 and 4, the return conveyor chains 9 are trained around driving sprocket wheels on a shaft 70 which is driven by chains 71 from the same shaft 66 that drives the transmission chains 60 for the carriers which convey the sticks and hanging festoons of board through the drying room. At the delivery end of the drying room (Figs. 5, 6 and 15) the return conveyor chains are trained around sprockets on a shaft 72, from which the ejecting wheels 53 may be driven by a chain transmission 73 or other suitable connection.

The shaft 66 (Figs. 3 and 4) is driven by a chain 74 from a shaft 75 below the floor of the drying room; and the last mentioned shaft 75 is driven by a chain 76 from a suitable transmission mechanism, including, if desired, a Reeves variable speed transmission, which in turn may be driven from any suitable source of power or from a transmission connected with the coating machine whereby the hang-up and conveying system of the drying room may be operated in synchronism therewith.

By varying the speed of the elevating chains 6 in relation to the rate of delivery of the board to the apparatus, the intervals of hanging up the board in festoons may be adjusted, thereby varying the amount of board in individual festoons and accordingly varying the amount of board exposed to drying action. Such speed variation may be accomplished either by speed adjustment of the entire hang-up and conveying system, or by changing the sprocket gear ratios of the driving and driven sprockets of the elevating chains. A slight reduction or increase in speed results in a large increase or reduction in the amount of material hung up.

The various conveying chains of the drying room conveying system may run over suitable supporting rails, and may be associated with suitable side guides to prevent displacement of the sticks longitudinally, or in a direction transverse of the board. Such supporting rails for certain of the chains are shown at 77 in Figs. 9 and 13. Side guides to prevent endwise displacement of the sticks are shown at 78 in said figures. Idle sprockets or guide wheels for the lower runs of conveying or transmission chains are shown at 79 in Figs. 4, 6, 9 and 13.

The overhead rollers 18, 19 and 20, over which the board may be trained for shifting it longitudinally to change the points of suspension, may be driven by sprocket chains 80 from certain of the stub shafts 61. In Fig. 13, one of such overhead rollers is shown, the shaft 81 of said roller having a sprocket wheel 82 for engagement by its driving chain.

As the board runs from the drying room, it may be exposed to the action of hot air blasts discharged from suitable pipes, one of which is shown at 83 in Fig. 6, for the purpose of additional or superdrying action, and to heat the coated surface advantageously for the finishing operation.

By employing an apparatus and method embodying all of the features of the present invention, a product thoroughly and substantially uniformly dried in proper condition; and substantially free of flaws including checks or creases, may be obtained. The illustrative apparatus also eliminates objectionable and inconvenient handling of the board or its supports, and is adapted for economical and rapid manufacturing practice. The structure of the apparatus is such that duplicates of desired sections may be interposed where and if desired.

Obviously the present invention is not limited to the specific details of construction and arrangement or mode of operation of the illustrative apparatus, since such details may be variously modified to meet different manufacturing conditions and requirements. Moreover it is not indispensable that all of the features of the invention be used conjointly, since they may be advantageously used in various different combinations and sub-combinations.

Having described an embodiment of our invention, we claim:

1. A web drying apparatus comprising, in combination, a drying enclosure; successively arranged means including alternating means running at alternating speeds for continuously moving the web undergoing treatment through the drying enclosure while maintaining the web in undulating formation and providing alternating distended and contracted accumulations thereof.

2. A drying apparatus comprising, in combination, a drying enclosure; means for projecting heat currents transversely of the enclosure; and means for moving a quantity of material in undulating formation through the enclosure; said last named means acting to present the undulations in alternately expanded and contracted condition in different zones of the enclosure while effecting lineal movement of the material to refrom the festoons.

3. A drying apparatus comprising, in combination, a drying enclosure; means for maintaining a quantity of continuous material in undulating formation in said enclosure; means for progressively drying said material in successive stages of drying action of different effects; and effecting a plurality of reformations of the undulations to present the material differently in successive drying stages.

4. A drying apparatus comprising, in combination, means for supporting a web in undulating formation while undergoing drying action; and means for effecting a succession of alternating expansions and contractions of its undulations.

5. A drying apparatus comprising, in combination, means for supporting a web in undulating formation while undergoing drying action; and means for successively reforming the festoons while maintaining them in alternately spread out and contracted condition.

6. A drying apparatus comprising, in combination, supports carrying a web in festoons; and means acting upon said supports to change the point of suspension of the web thereon for carrying the festoons in repeatedly changing conditions for exposure to drying action.

7. A web drying apparatus comprising, in combination, means for accumulating the web in undulations and exposing said undulations to drying action; and means for varying the accumulating capacity of the apparatus.

8. A web drying apparatus comprising, in combination, means for accumulating the web in undulations and exposing the same to drying action, while supplying the web to and withdrawing it from the apparatus; and means of variable capacity for accumulating the undulations of the dried web.

In testimony whereof, we have signed our names to this specification.

CHARLES C. COLBERT.
GEORGE E. PRESTON.